United States Patent
Nakao et al.

(10) Patent No.: US 8,225,323 B2
(45) Date of Patent: Jul. 17, 2012

(54) CONTROL DEVICE AND CONTROL METHOD FOR REDUCED POWER CONSUMPTION IN NETWORK DEVICE

(75) Inventors: Yoshihiro Nakao, Yokohama (JP); Masayuki Shinohara, Kawasaki (JP); Takayuki Muranaka, Kawasaki (JP); Atsushi Serizawa, Minamiashigara (JP)

(73) Assignee: Alaxala Networks Corporation, Kanagawa (JP)

( * ) Notice: Subject to any disclaimer, the term of this patent is extended or adjusted under 35 U.S.C. 154(b) by 1164 days.

(21) Appl. No.: 12/028,233

(22) Filed: Feb. 8, 2008

(65) Prior Publication Data

US 2008/0320488 A1    Dec. 25, 2008

(30) Foreign Application Priority Data

Jun. 25, 2007 (JP) .................................. 2007-166550
Aug. 27, 2007 (JP) .................................. 2007-219185

(51) Int. Cl.
*G06F 9/455* (2006.01)
*G06F 9/46* (2006.01)

(52) U.S. Cl. ............................. 718/104; 713/1; 713/100

(58) Field of Classification Search .................. 713/300, 713/320, 324; 718/1, 100, 104
See application file for complete search history.

(56) References Cited

U.S. PATENT DOCUMENTS

| 7,571,335 | B2 * | 8/2009 | Lee ................................. 713/330 |
| 7,788,332 | B2 * | 8/2010 | Manohar et al. ............... 709/207 |
| 2007/0094396 | A1 * | 4/2007 | Takano et al. .................. 709/226 |
| 2007/0180452 | A1 | 8/2007 | Hirayama et al. |
| 2007/0245163 | A1 * | 10/2007 | Lu et al. ......................... 713/300 |
| 2009/0094467 | A1 * | 4/2009 | Baba et al. ..................... 713/300 |
| 2010/0169678 | A1 * | 7/2010 | Kozuka ......................... 713/310 |

FOREIGN PATENT DOCUMENTS

| JP | 2000201166 | 7/2000 |
| JP | 2004135106 | 4/2004 |
| JP | 2005011331 | 1/2005 |
| JP | 2007228491 | 9/2007 |
| JP | 20072228490 | 9/2007 |

* cited by examiner

*Primary Examiner* — Thomas Lee
*Assistant Examiner* — Samantha Hoang
(74) *Attorney, Agent, or Firm* — Brundidge & Stanger, P.C.

(57) ABSTRACT

This invention provides a data transfer control device for carrying out data transfer using a plurality of transfer resources. The data transfer control device comprises a transfer resource management portion that set the plurality of transfer resources to either one of a transfer-enabled state whereby data transfer is enabled and a plurality of standby states on the basis of a load on the data transfer control device and that manages the plurality of transfer resources so as to assume the set operating status; and a load distribution portion that distributes the data to transfer resources that have been set to the transfer-enabled state. The plurality of standby states are states which data transfer is disabled and which mutually differ at a minimum in terms of at least one of power consumption level and transition time to the transfer-enabled state.

24 Claims, 12 Drawing Sheets

Fig.10
EMBODIMENT 2
STATISTICAL DATE FOR TRAFFIC LOAD FLUCTUATION (ONE YEAR)
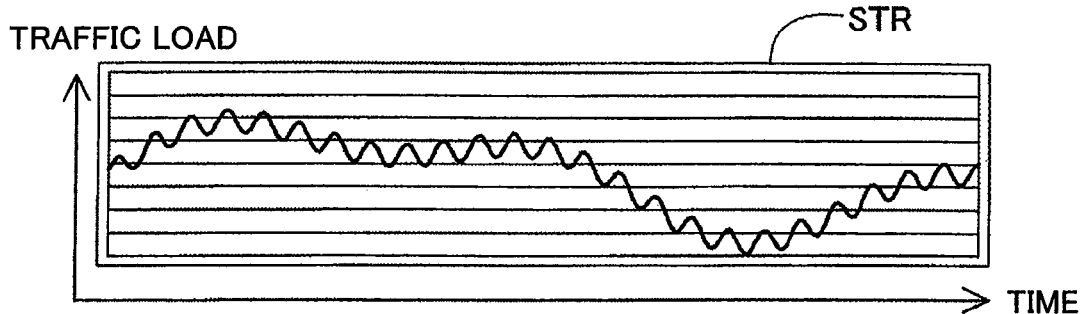
TRAFFIC LOAD FLUCTUATION (HIGH-FREQUENCY COMPONENT)
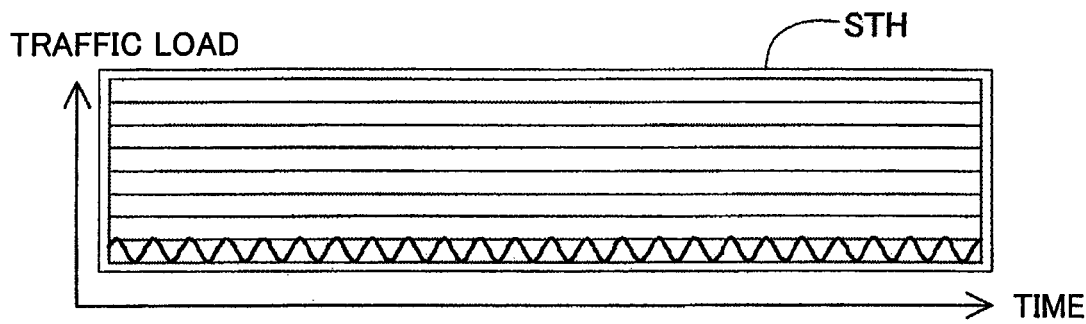
TRAFFIC LOAD FLUCTUATION (MEDIUM-FREQUENCY COMPONENT)
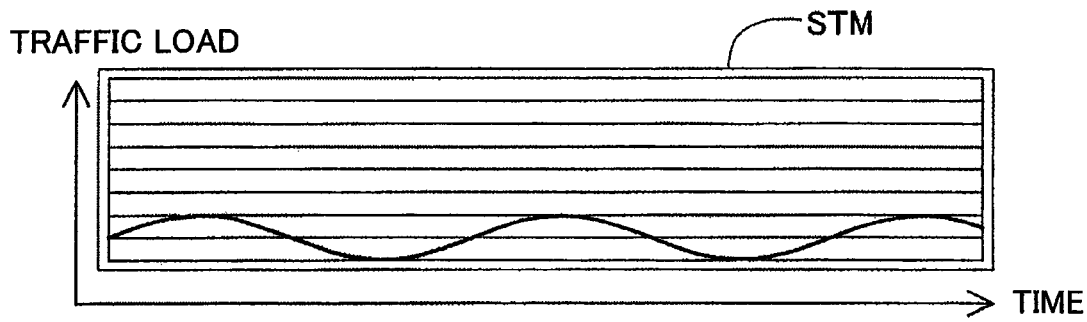
TRAFFIC LOAD FLUCTUATION (LOW-FREQUENCY COMPONENT)
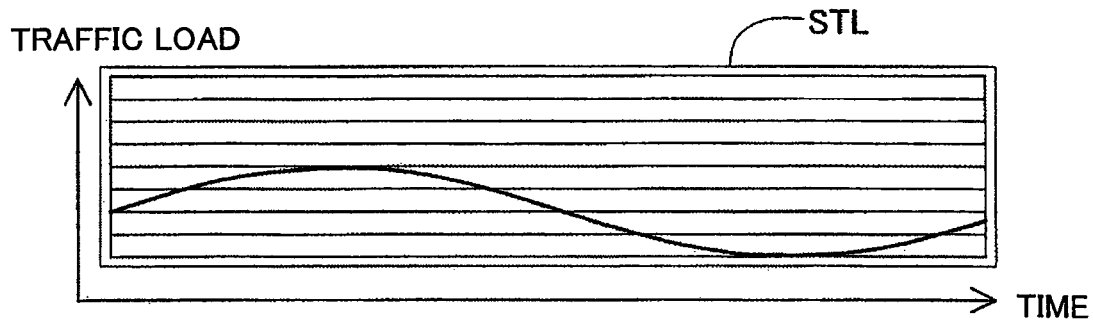

TRAFFIC LOAD FLUCTUATION IN FREQUENCY DOMAIN

CONTROL DEVICE AND CONTROL METHOD FOR REDUCED POWER CONSUMPTION IN NETWORK DEVICE

CLAIM OF PRIORITY

The present application claims priority from Japanese applications P2007-166550A filed on Jun. 25, 2007 and P2007-219185A filed on Aug. 27, 2007, the content of which is hereby incorporated by reference into this application.

BACKGROUND

1. Field of the Invention

The present invention relates to technology for carrying out transfer of data in a network.

2. Description of the Related Art

Network devices that use multiple transfer resources in order to perform data transfer have come to be used for applications such as IX and company internal networks. In such network devices, past practice has been to use all of the transfer resources irrespective of the level of traffic. The related art is disclosed in the applications JP-A-P2004-135106A and JP-A-pP2000-201166A However, as there is substantially no drop in power consumption by transfer resources in association with the lower data transfer levels, some of the power consumed during times of low traffic at certain times of day or certain seasons will be wasted. This problem is not just one relating to traffic fluctuations associated with certain times of day, but rather one relating to the general versatility of network devices with respect to traffic requests. Specifically, it has proven difficult to provide a network device able to operate at appropriate power levels depending on traffic requests. By way of a specific example, providing network devices of differing processing capabilities and power consumption for high-load applications such as IX (Internet eXchange) and for relatively low-load applications was associated with increased administration costs and hardware costs.

SUMMARY

With a view to addressing the problem outlined above, it is an object of the present invention to provide technology for reducing power consumption with substantially no drop in transfer capability during data transfer carried out through transfer of data using multiple transfer resources.

One aspect of the present invention provides a data transfer control device for carrying out data transfer using a plurality of transfer resources. A data transfer control device connected to a plurality of circuits, comprising:

a transfer resource management portion that set the plurality of transfer resources to either one of a transfer-enabled state whereby data transfer is enabled and a plurality of standby states on the basis of a load on the data transfer control device and that manages the plurality of transfer resources so as to assume the set operating status; and a load distribution portion that distributes the data to transfer resources that have been set to the transfer-enabled state;

wherein the plurality of standby states are states which data transfer is disabled and which mutually differ at a minimum in terms of at least one of power consumption level and transition time to the transfer-enabled state.

In the data transfer control device of the present invention, the operating status of the plurality of transfer resources is managed on the basis of the load on the data transfer control device so that the operating status thereof assumes a transfer-enabled state whereby data transfer is enabled, or any of a plurality of standby states which mutually differ in terms of power consumption level and/or transition time to the transfer-enabled state. Consequently, in response to load fluctuations the device can utilize any of standby states which mutually differ in terms of power consumption level and/or transition time. Both rapid response to load fluctuations and reduced power consumption can be achieved thereby.

In the aforementioned data transfer control device, the plurality of standby states may include two standby states in which the transition time is longer the lower the power consumption level.

In the aforementioned data transfer control device, the transfer resource management portion may additionally predict fluctuation of the load and carry out management of the plurality of transfer resources on the basis of the predicted fluctuation.

In the aforementioned data transfer control device, management of the transfer resources may additionally involve predicting fluctuation of the load on each individual circuit of the data transfer control device, and managing the plurality of transfer resources on the basis of the predicted total load on all circuits. For example, since the cyclical nature of communication will differ between some kinds of communication and enterprise data communication in which transfer levels increase during specific time periods, a higher degree of accuracy in management can be achieved by enhancing the accuracy of prediction. Additionally, it is conceivable that differences in data communication characteristics may arise due to time differences between individual regions, and so on.

In the aforementioned data transfer control device, the transfer resource management portion may additionally store load prediction information predicted in advance and relating to future load fluctuation, and carry out the prediction on the basis of the load prediction information. For example, it would be possible to make a prediction on the basis of an increase in load due to a non-regular event such as the World Cup or the opening of the high school baseball season (opening day is different each year), for which it is difficult to predict increased load based on periodic nature (season) alone, but which is nevertheless a scheduled event that is known in advance. In this way, fluctuations in load may be predicted on the basis of information representing predicted load fluctuations that have been predicted in advance outside the network transfer system (discussed later).

Specifically, a management server (discussed later) may be provided with a memory area, not shown, having an event calendar (load prediction information) stored therein; and load may be predicted on the basis of this event calendar. The present invention is applicable to instances in which load is predicted by any of various methods: for example it would be acceptable to predict load fluctuations on the basis of the rate of change of load; or to compile a database of load fluctuation patterns and to activate extra transfer resources in response to detection of an unknown fluctuation pattern.

In the aforementioned data transfer control device, the transfer resource management portion may additionally carry out prediction on the basis of cyclical nature of the load.

The amount of data transfer has a cyclical characteristic owing to its intimate relationship with human activity which is cyclical in nature. With this configuration, fluctuations in load can be predicted on the basis of this cyclical nature, so multiple transfer resources can be managed appropriately. As a result, it is possible to respond more appropriately to load fluctuations, and to minimize transfer volume margins for multiple transfer resources. "Cyclical nature" herein refers to a phenomenon that includes at least the characteristic of phase (relationship to time) or of period (inverse of frequency), or both.

In the aforementioned data transfer control device, management of the plurality of transfer resources on the basis of the predicted fluctuation may additionally involve predicting fluctuation of the load in relation to at least one specific period, and managing at least one specific standby state among the plurality of standby states on the basis of predicted fluctuation of load in the specific period.

By managing a specific standby state on the basis of fluctuation of load in a specific period in this way, it is possible to achieve fine-tuned control with consideration to the cyclical nature of data transfer volume.

In the aforementioned data transfer control device, management of the plurality of transfer resources on the basis of the predicted fluctuation may additionally involve predicting fluctuation of the load in relation to a plurality of specific periods; and associating individual fluctuations of the load with individual transitions of a plurality of specific standby states among the plurality of standby states, on the basis of load fluctuation predicted for each of the plurality of specific periods; and the associations may be made such that specific periods of longer period correspond to standby states for which the power consumption is lower and the transition time is longer.

Through management involving association in this way such that specific periods of longer period correspond to standby states for which the power consumption is lower and the transition time is longer, it is possible for example to bring about transition from a standby state having a long transition time in response to a load fluctuation having a relatively long period or to bring about transition from a standby state having a short transition time in response to a load fluctuation having a relatively short period, so that response to load fluctuations can be improved.

In the aforementioned data transfer control device, the data transfer control device may carry out data transfer through a plurality of communication data classes (communication classified by a specific rule) having been pre-classified into a plurality of types, and management of the plurality of transfer resources on the basis of the predicted fluctuation may additionally involve predicting fluctuation of the load in at least one type of specific communication data class among the plurality of types of communication data class in relation to a plurality of specific periods; and associating individual fluctuations of the load with individual transitions of a plurality of specific standby states among the plurality of standby states on the basis of load fluctuation predicted for each of the plurality of specific periods in the specific communication data class.

Thus, since for example the cyclical nature of communication differs between data communication by telephone, in which transfer levels increase during specific time periods, and other kinds of communication, a higher degree of accuracy in management can be achieved by enhancing the accuracy of prediction.

In the aforementioned data transfer control device, the data transfer control device may carry out data transfer through a plurality of communication data classes having been pre-classified into a plurality of types, each of the plurality transfer resources in the transfer-enabled state may be assigned any of the plurality of types of communication data class;

the transfer resource management portion may additionally manage the transfer resources for each of the plurality of types of communication data class, on the basis of load fluctuation for each of the plurality of types of communication data class; and the load distribution portion may additionally analyze which of the plurality of types of communication data class is being used to communicate the data, and distribute the data by distributing the analyzed data to transfer resources assigned to the same communication data class as the analyzed data. The data transfer control device can narrow down the communication data classes targeted for processing by the transfer resources, thereby achieving reduced power consumption, as well as greater process efficiency and stability.

In the aforementioned data transfer control device, management of the transfer resources may additionally involve predicting load fluctuation in at least one type of specific communication data class among the plurality of types of communication data class, and managing the plurality of transfer resources on the basis of the predicted fluctuation.

In the aforementioned data transfer control device, the transfer resource management portion may additionally store load prediction information predicted in advance and relating to future load fluctuation, and carry out the prediction on the basis of the load prediction information; or the transfer resource management portion may additionally carry out prediction on the basis of cyclical nature of the load.

Where transitions of specific standby states are managed on the basis of predicted load fluctuations in specific communication data classes in this way, is possible to achieve fine-tuned control with consideration to predicted future fluctuations of data transfer volume in specific communication data classes (e.g. data communication by telephone in which transfer volume increases for a specific time period) and to differences in the importance thereof.

In the aforementioned data transfer control device, management of the plurality of transfer resources may additionally involve predicting load fluctuation in the specific communication data class in relation to at least one specific period; and on the basis of the predicted load fluctuation in the specific communication data class in the specific period, managing transition among at least one specific standby state among the plurality of standby states and transfer resources in the transfer-enabled state which have been assigned to the specific communication data class.

In the aforementioned data transfer control device, the plurality of standby states may include a suspended operation state in which the supply of power is suspended and during transition to the transfer-enabled state of a transfer resource in an operating state which is one of the plurality of standby states except for the suspended operation state, the transfer resource management portion may additionally carry out transition of the transfer resource in the suspended operation state to the state of the transitioned transfer resource prior to the transition.

Since the reduction in the number of transfer resources in operating states except for the suspended operation state in which the supply of power is suspended can be suppressed when transfer resources are transitioned to the transfer-enabled state due to an increase in load, the above data transfer control device suppresses a drop in responsiveness caused by transition to the transfer-enabled state in response to a load fluctuation.

The present invention further provides a network transfer system for transferring data in a network. This network transfer system comprises a circuit interface portion connected to a network circuit, for transmitting and receiving the data;

a plurality of transfer resources for carrying out transfer processing of the data; and any of the data transfer control devices set forth hereinabove.

The present invention further provides a data transfer control method for carrying out data transfer using a plurality of transfer resources. This network transfer method comprises the steps of on the basis of the load on the data transfer control device, setting the operating status of the plurality of transfer resources to a transfer-enabled state whereby data transfer is enabled, or to any of a plurality of standby states whereby data transfer is disabled and which mutually differ at a minimum in terms of at least one of power consumption level and transition time to the transfer-enabled state; and managing the plurality of transfer resources so as to assume the set operating status; and distributing the data to transfer resources that have been set to the transfer-enabled state.

The present invention is not limited to the embodiments set forth above and may also be reduced to practice as a network transfer method. Furthermore there are various other possible embodiments as well, such as embodiment as a computer program for building such a method or device or as a recording medium having such a computer program recorded thereon.

BRIEF DESCRIPTION OF THE DRAWINGS

FIG. 10 is a timing chart depicting an example of statistical fluctuation of traffic load in a network transfer system 100 in Embodiment 2 of the present invention;

DESCRIPTION OF THE PREFERRED EMBODIMENTS

A. Network Transfer System of Embodiment 1 of the Present Invention

Figure 1:
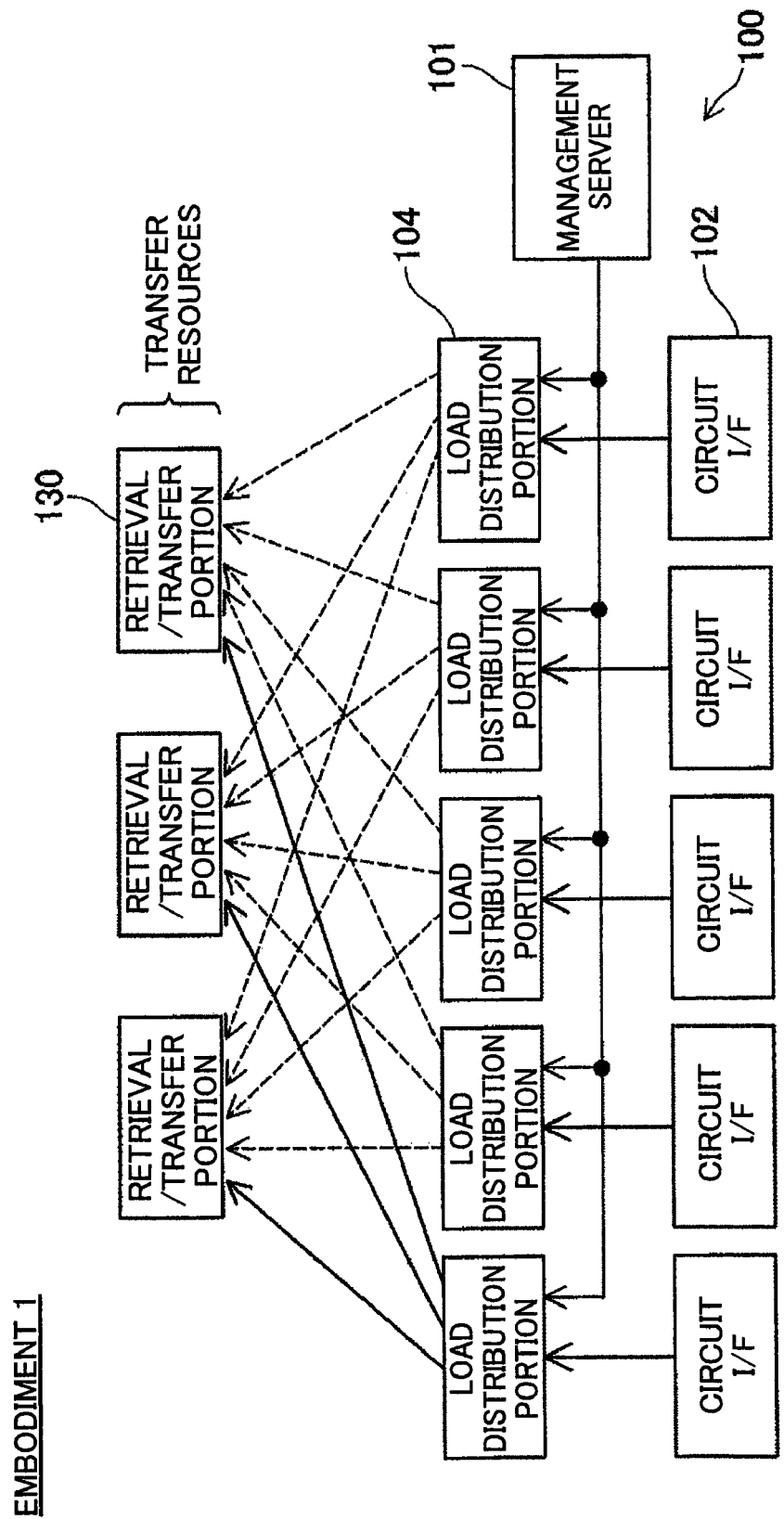
FIG. 1 is a block diagram depicting an overview of a network transfer system 100 in Embodiment 1 of the present invention.

Certain specific preferred embodiments of the present invention will be described below. FIG. 1 is a block diagram depicting an overview of a network transfer system 100 in a first embodiment of the present invention. The network transfer system 100 includes five circuit interface portions 102, three retrieval/transfer portions 130, five load distribution portions 104, and a management server 101 for controlling these. Control of the circuit interface portions 102 and the retrieval/transfer portions 130 by the management server 101 may take place via the load distribution portions 104 as depicted in FIG. 1; or a configuration involving direct control may be employed.

The circuit interface portions 102 are connected to a plurality of external network circuits, not shown; they execute physical layer processes such as shaping electrical signals for sending and receiving frame data, as well as the process of multiplexing the circuits (e.g. through time division or frequency division). From the header information in the frame data, the retrieve/transfer portions 130 determine the frame transfer destination port of the network transfer system 100, and transfer the frame data. The load distribution portions 104 distribute the transfer process among each of the three retrieval/transfer portions 130 on the basis of instructions from the management server 101 and the load on each of the retrieval/transfer portions 130. This distribution will be discussed in detail later.

The five circuit interface portions 102 are connected to each of the three retrieval/transfer portions 130 via all five of the load distribution portions 104 (FIG. 1). In other words, each of the five circuit interface portions 102 connected in the bidirectional way with the external network circuits is able to connect to any of retrieval/transfer portions 130 via the load distribution portions 104 each connected therewith.

The retrieval/transfer portions 130 and the management server 101 correspond respectively to the "transfer resources" and "transfer resource management portion" recited in the claims. In the present embodiment, the network transfer system 100 employs circuit interface portions 102 capable of both transmitting and receiving; however, a configuration having a circuit interface portion for receiving (not shown) and a different circuit interface portion for transmitting (not shown) would be acceptable as well. In such a configuration, these portions could be constituted either as an integrated unit or as separate components.

Figure 2:
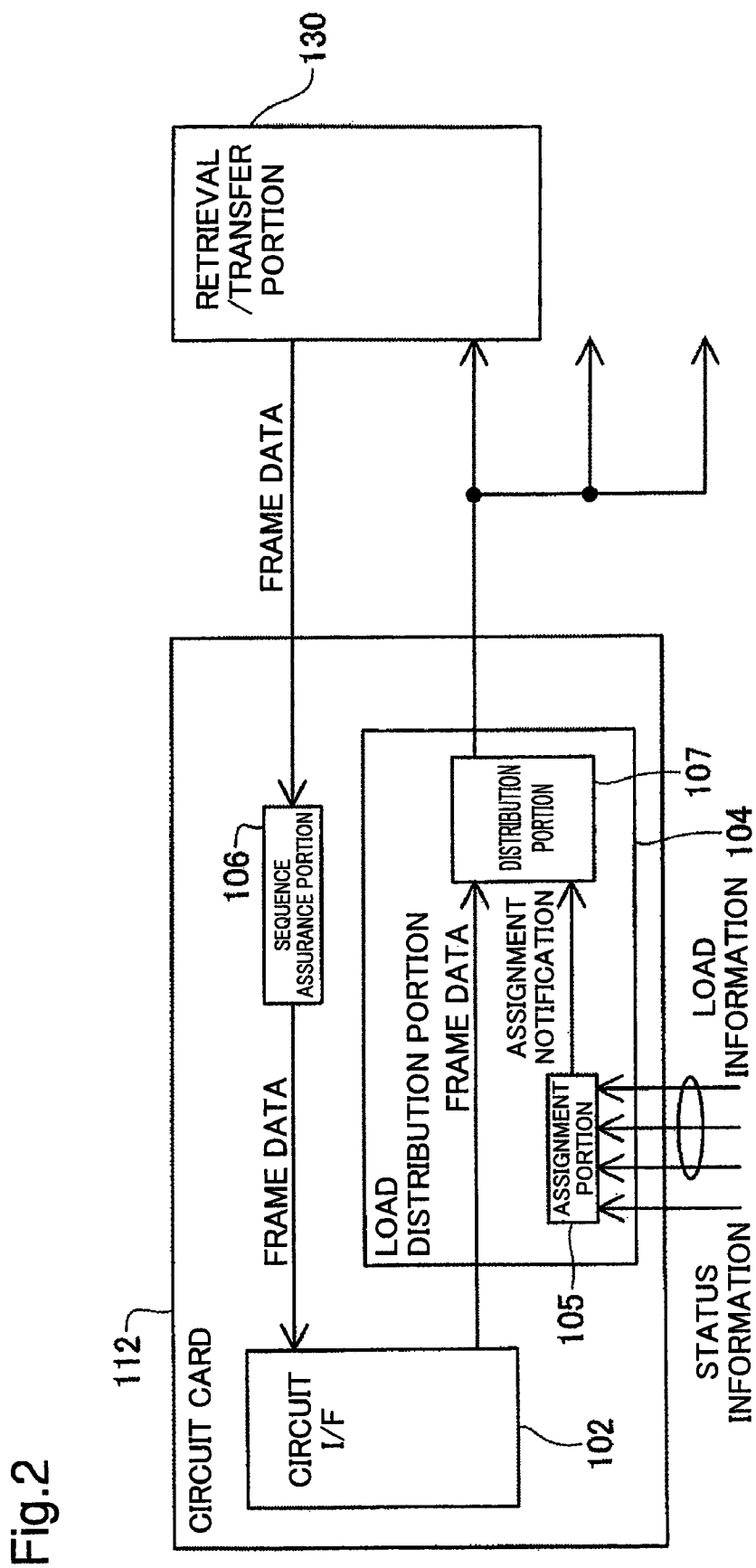
FIG. 2 is a block diagram depicting a circuit card 112 as an implementation example of Embodiment 1.

FIG. 2 is a block diagram depicting a circuit card 112 as an implementation example of the first embodiment. the circuit card 112 includes the circuit interface portion 102, the load distribution portion 104, and a sequence assurance portion 106. The sequence assurance portion 106 sorts the data sequence so that the sequence of multiple frame data input from the retrieval/transfer portion 130 matches the correct original sequence, and outputs the data to the circuit interface portion 102.

The load distribution portion 104 includes a distribution portion 107 for distributing frame data to each of the three retrieval/transfer portions 130, and an assignment portion 105 for presenting the distribution portion 107 with assignment notification data instructing the distribution destinations.

There are various possible frame data distribution formats for the distribution portion 107, such the hash format whereby the sequence of frame data can be assured through analysis; and the round-robin format whereby the sequence of frame data cannot be assured. Where only the hash format or other format which assures the sequence of frame data is used as the frame data distribution format by the load distribution portion 104, the sequence assurance portion 106 may be omitted.

The assignment portion 105 generates assignment notification data on the basis of status data provided by the management server 101 and load information provided by the three retrieval/transfer portions 130. The status information will include operating status of each of the retrieval/transfer portions 130, i.e. information representing whether it is in the transfer-enabled state or any of the standby states (transfer-disabled states). The load information will include information representing load conditions of each of the three retrieval/transfer portions 130. Determinations of distribution destination may be made, for example, by having the assignment portion 105 identify at least one transfer-enabled retrieval/transfer portion 130 on the basis of the status information; and from among the identified retrieval/transfer portions 130 select that with the lowest transfer load, on the basis of the load information.

The load information may also include information representing load information for each of the circuits belonging to the plurality of circuit interfaces (the five circuit interface portions 102).

Figure 3:
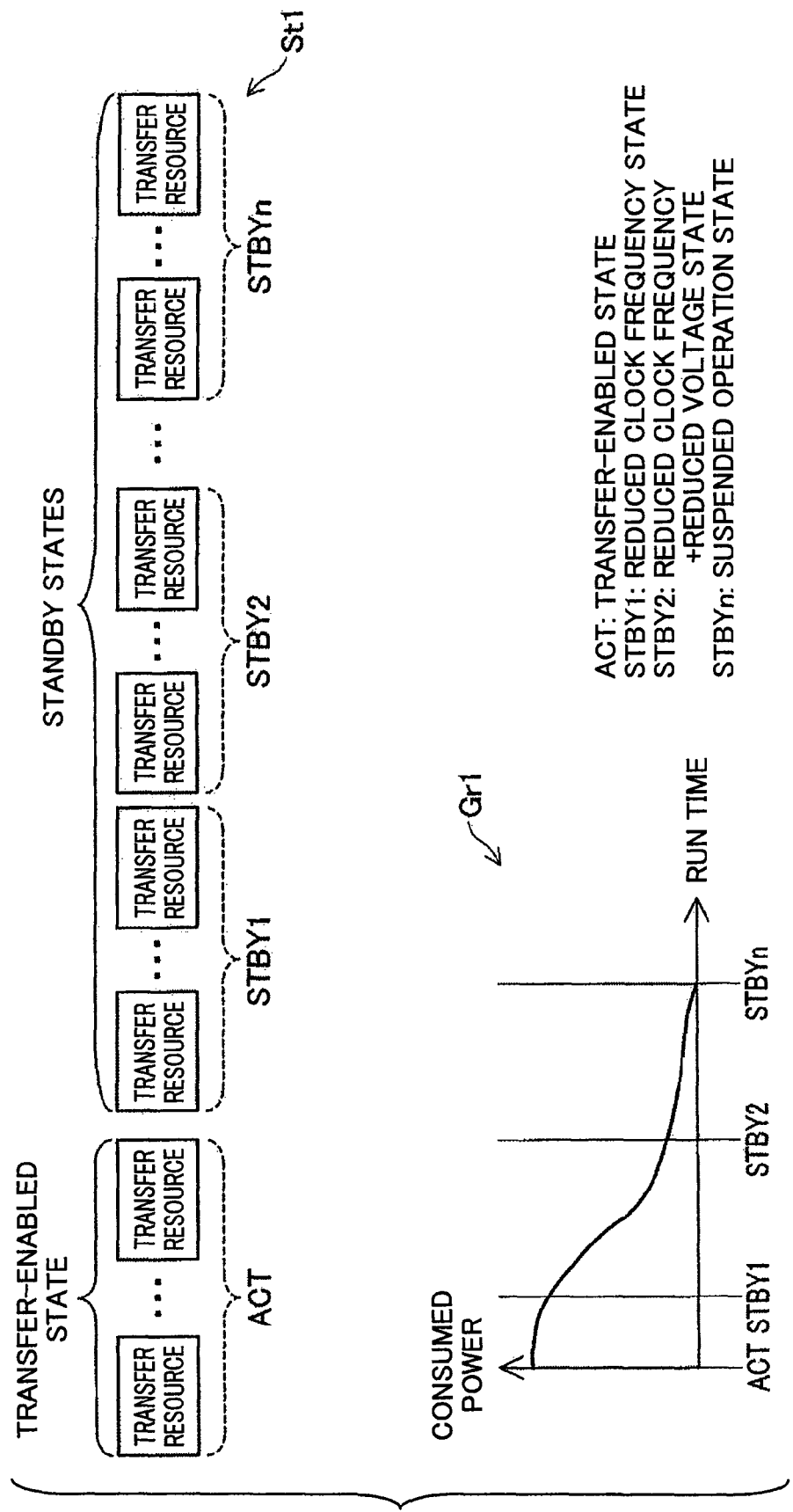
FIG. 3 is an illustration showing the concept of management status of multiple transfer resources.

FIG. 3 is an illustration showing the concept of management status of multiple transfer resources. In Embodiment 1, the transfer resources correspond to the retrieval/transfer portions 130. Operating status St1 of the multiple transfer resources is divided into a transfer-enabled state Act and several standby states STBY1 through STBYn which represent transfer-disabled states. The standby states are in turn divided into a first through n-th standby state STBY1 through STBYn which differ from one another in terms of transition time to the transfer-enabled state, and power consumption. In this example, a first standby state STBY1, a second standby state STBY2, and a third standby state STBY3 respectively represent a reduced clock frequency state, a reduced clock frequency/reduced voltage state, and a suspended operation state.

As will be apparent from the graph Gr1, the first standby state STBY1, the second standby state STBY2, and the third standby state STBY3 differ from one another in terms of transition time to the transfer-enabled state Act and in power consumption. Specifically, the first standby state STBY1 is the standby state with the shortest transition time to the transfer-enabled state Act and the largest power consumption. The second standby state STBY2 is a standby state with a longer transition time to the transfer-enabled state Act than first standby state STBY1, but lower power consumption than the first standby state STBY1.

It is possible to establish any number of these standby states between the transfer-enabled state Act and the suspended operation state STBYn. For example, it would be possible to utilize a drop in voltage produced by stopping various circuits, i.e. the interface circuit with an external memory, not shown, or a SERDES (SERializer/DESerializer), or by a voltage margin resulting for example from a drop in clock frequency or from a temperature drop during a period of low load, in order to achieve lower power consumption in the standby states. However, where a voltage margin caused by a temperature drop is utilized, it will be preferable to estimate the voltage margin on the basis of actual temperature measurement.

Figure 4:
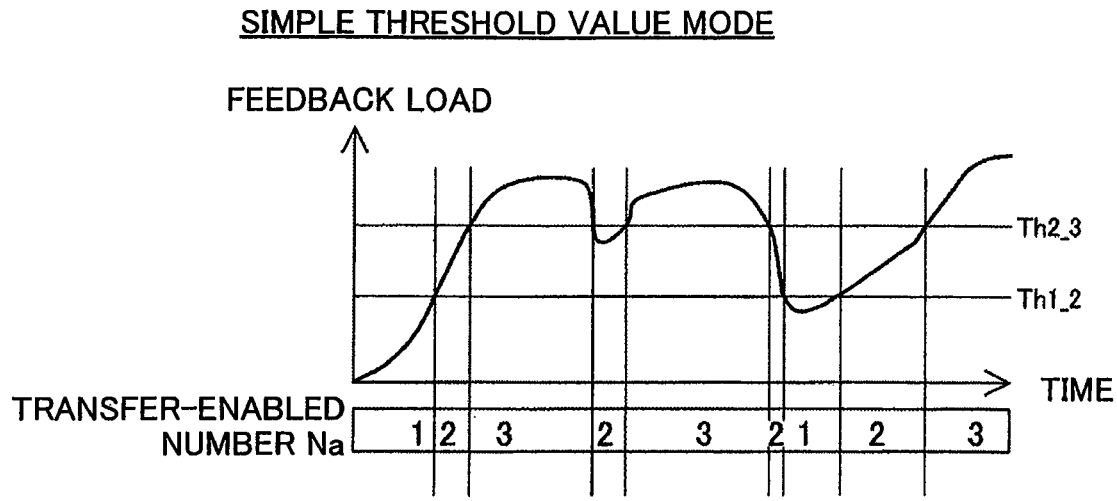
FIG. 4 is a timing chart depicting an example of temporal fluctuations in the number of retrieval/transfer portions 130 placed in the transfer-enabled state Act in a simple threshold value mode.

FIG. 4 is a timing chart depicting an example of temporal fluctuations in the number of retrieval/transfer portions 130 placed in the transfer-enabled state Act in a simple threshold value mode. In this example, the number of retrieval/transfer portions 130 to be placed in the transfer-enabled state Act will be determined by a feedback format depending on the load (traffic load) on the network transfer system 100, using two threshold values Th1_2 and Th2_3.

Figure 5:
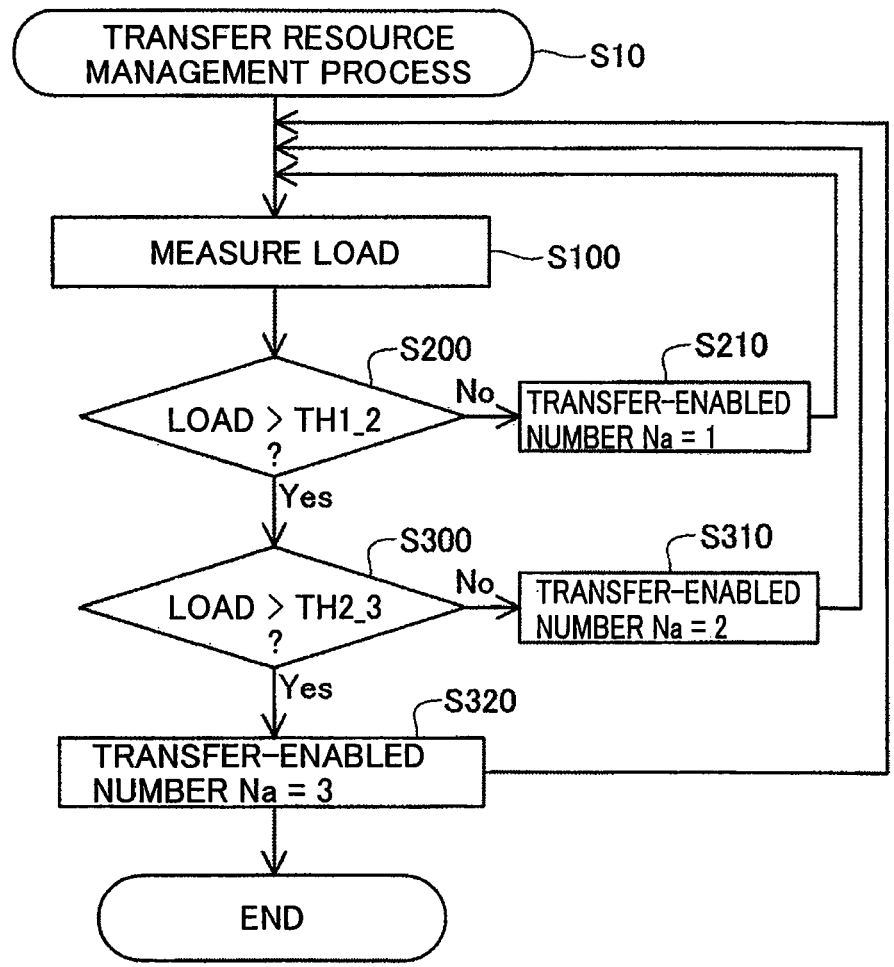
FIG. 5 is a flowchart depicting a transfer resource management process routine in simple threshold value mode.

FIG. 5 is a flowchart depicting a transfer resource management process routine in simple threshold value mode. In Step S100, the management server 101 will perform load measurement of traffic load. Load measurement can be carried out, for example, by computing total frame data transfer volume for the multiple transfer resources (the three retrieval/transfer portions 130). In Step S200, the management server 101 will decide whether the measured load exceeds the preset threshold value Th1_2. If the load is smaller than the threshold value Th1_2, the multiple transfer resources will be controlled such that the number of retrieval/transfer portions 130 placed in the transfer-enabled state Act equals 1. On the other hand, if the load exceeds the threshold value Th1_2, the process will advance to Step S300.

Load measurement may also be carried out by computing total frame data transfer volume for the circuits belonging to the multiple circuit interfaces (the five circuit interface portions 102).

In Step S300, the management server 101 will decide whether the measured load exceeds the preset threshold value Th2_3. If the load is smaller than the threshold value Th2_3, the multiple transfer resources will be controlled such that the transfer-enabled number Na equals 2 (Step S310). On the other hand, if the load exceeds the threshold value Th2_3, the multiple transfer resources will be controlled such that the transfer-enabled number Na equals 3 (Step S320). This process is carried out at a prescribed cycle (e.g. every one second), so that the number of retrieval/transfer portions 130 placed in the transfer-enabled state Act will fluctuate depending on traffic load.

Figure 6:
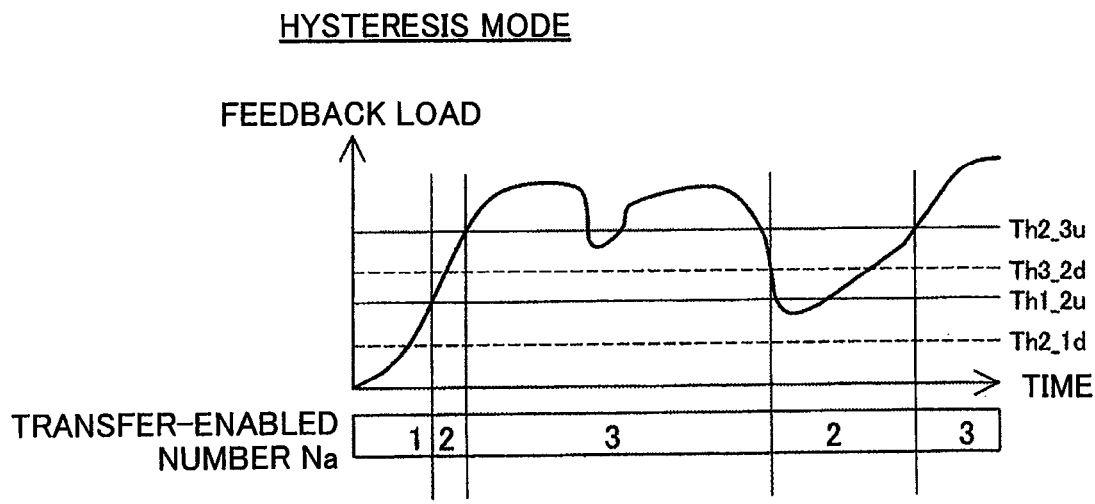
FIG. 6 is a timing chart depicting another example of temporal fluctuation of the transfer-enabled number Na in hysteresis mode.

FIG. 6 is a timing chart depicting another example of temporal fluctuation of the transfer-enabled number Na in hysteresis mode. In this example, fluctuations of the transfer-enabled number Na are suppressed through hysteresis in addition to the feedback format mentioned above. This kind of hysteresis is accomplished using four threshold values Th1_2u, Th2_3u, Th2_1d, and Th3_2d.

Figure 7:
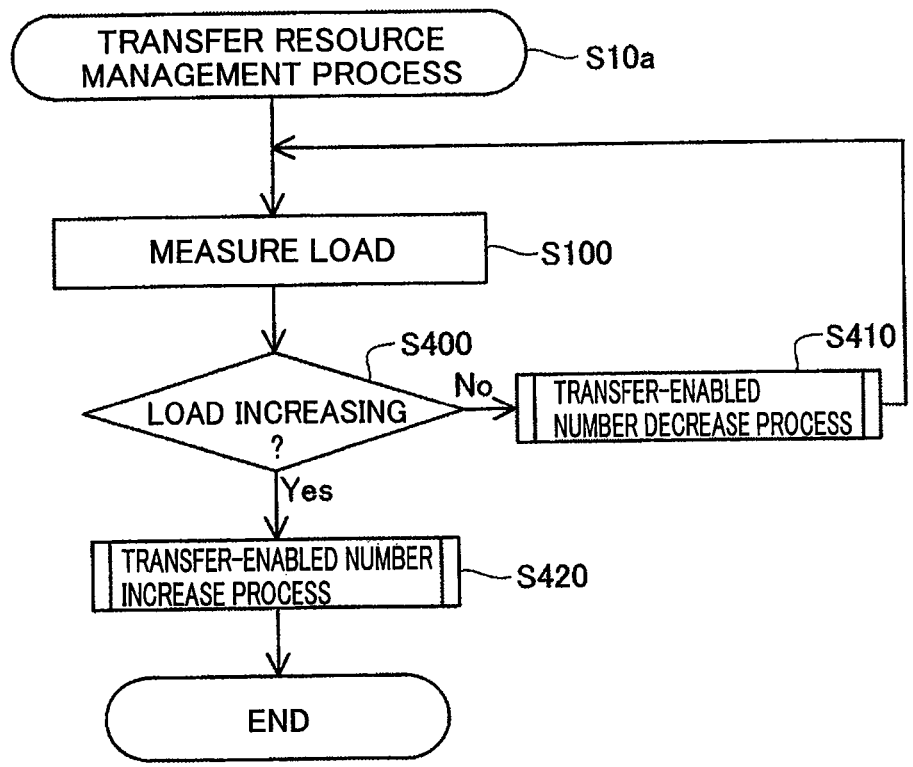
FIG. 7 is a flowchart depicting a transfer resource management process routine in hysteresis mode.

FIG. 7 is a flowchart depicting a transfer resource management process routine in hysteresis mode. In Step S100 load measurement of traffic load is performed in the same way as in simple threshold value mode. In Step 400, the management server 101 will decide whether the load in increasing or decreasing. This decision can be made, for example, by storing a data time series representing the load, and making reference to this. If as a result of the decision it is decided that the load is decreasing, the process will advance to a transfer-enabled number decrease process (Step S410), whereas if it is decided that the load is increasing, the process will advance to a transfer-enabled number increase process (Step S420).

Figure 8:
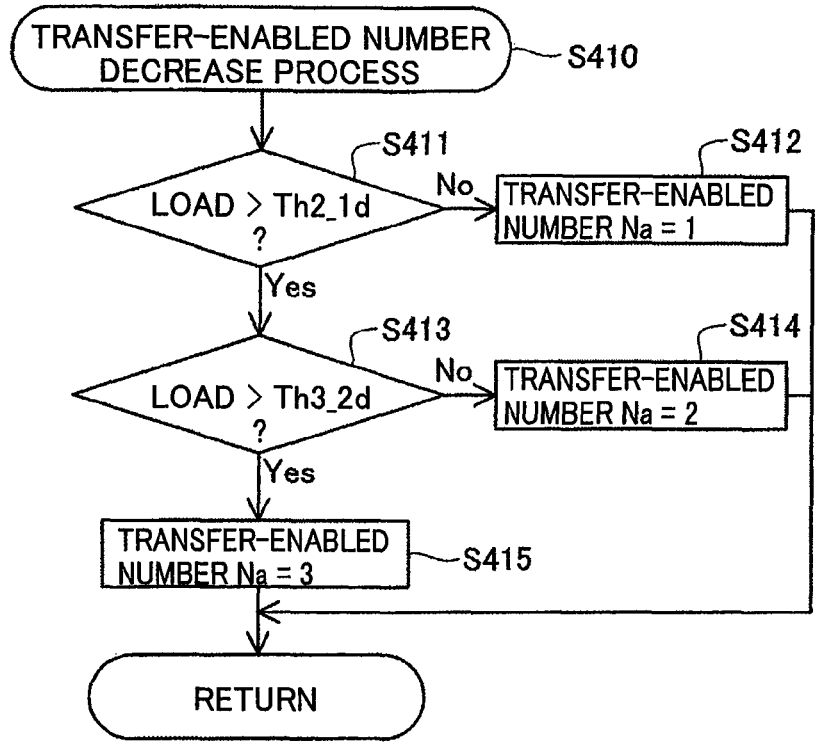
FIG. 8 is a flowchart depicting a transfer-enabled number decrease process routine (Step S410)

FIG. 8 is a flowchart depicting the transfer-enabled number decrease process routine (Step S410). In Step S411, the management server 101 will decide whether the load is greater than a preset threshold value $Th2\_1d$ for use in the transfer-enabled number decrease process. If the result of this decision is that the load is smaller than the threshold value $Th2\_1d$, the transfer resources will be controlled such that the transfer-enabled number Na equals 1 (Step S412), whereas if the load is greater than the threshold value $Th2\_1d$, the process will advance to Step S413.

In Step S413, the management server 101 will decide whether the load is greater than a preset threshold value $Th3\_2d$ for use in the transfer-enabled number decrease process. If the result of this decision is that the load is smaller than the threshold value $Th3\_2d$, the transfer resources will be controlled such that the transfer-enabled number Na equals 2 (Step S414), whereas if the load is greater than the threshold value $Th3\_2d$, the transfer resources will be controlled such that the transfer-enabled number Na equals 3 (Step S415).

Figure 9:
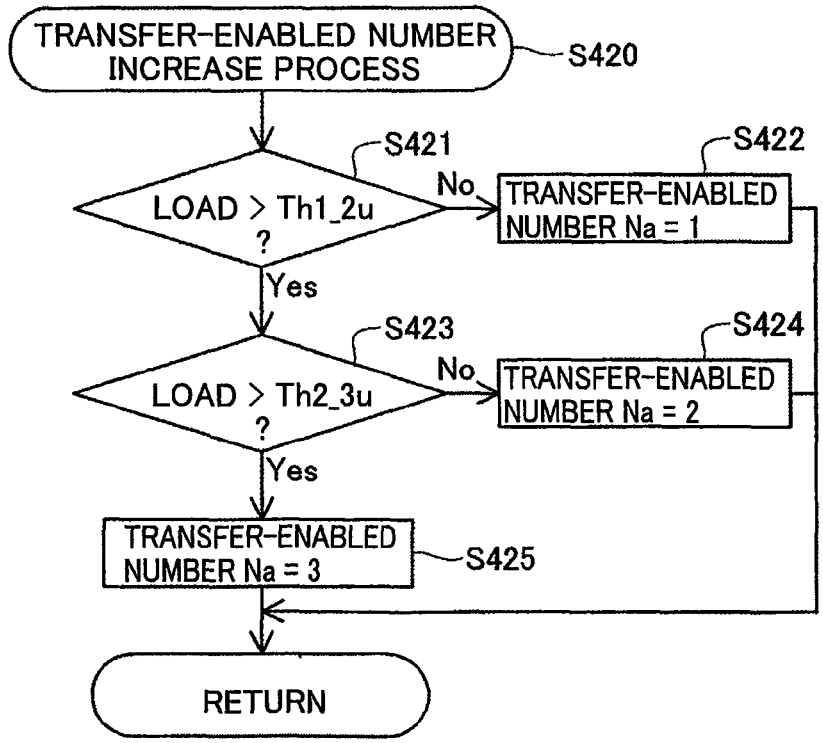
FIG. 9 is a flowchart depicting a transfer-enabled number increase process routine (Step S420)

FIG. 9 is a flowchart depicting the transfer-enabled number increase process routine (Step S420). In Step S421, the management server 101 will decide whether the load is greater than a preset threshold value $Th1\_2u$ for use in the transfer-enabled number increase process. If the result of this decision is that the load is smaller than the threshold value $Th1\_2u$, the transfer resources will be controlled such that the transfer-enabled number Na equals 1 (Step S422), whereas if the load is greater than the threshold value $Th1\_2u$, the process will advance to Step S423.

In Step S423, the management server 101 will decide whether the load is greater than a preset threshold value $Th2\_3u$ for use in the transfer-enabled number increase process. If the result of this decision is that the load is smaller than the threshold value $Th2\_3u$, the transfer resources will be controlled such that the transfer-enabled number Na equals 2 (Step S424), whereas if the load is greater than the threshold value $Th2\_3u$, the transfer resources will be controlled such that the transfer-enabled number Na equals 3 (Step S425).

In Embodiment 1, since the number of retrieval/transfer portions 130 placed in the transfer-enabled state Act can be varied appropriately depending on the traffic load in this way, the amount of power consumed in data transfer when transferring data using multiple transfer resources can be reduced. The term "cyclical nature" herein is used to include at least the characteristic of phase (relationship to time, e.g. day or night) or of period (inverse of frequency), or both.

In Embodiment 1 of the present invention, the management server 101 may also control the transfer resources using as the upper limit the total spectrum of the data transfer control device, this total spectrum of active circuits having been calculated from the linkup state in all of the circuits of the data transfer control device. In a transfer process of the total spectrum of active circuits, in the event it is not necessary to use all of the transfer resources at least one or more of the transfer resources can be transitioned to the standby state with the lowest power consumption. For example, when the total spectrum of active circuits is smaller than the threshold value $Th2\_3$, a maximum transfer-enabled number Na of 2 will suffice, and control will be carried out so that three resources never assume the transfer-enabled state simultaneously. At this time, at least one transfer resource can be transitioned to the standby state with the lowest power consumption.

B. Network Transfer System of Embodiment 2 of the Present Invention

FIG. 10 is a timing chart depicting an example of statistical fluctuation of traffic load in the network transfer system 100 in a second embodiment of the present invention. In this example, the sampling window is equivalent to one year. In FIG. 10 are shown time-series statistical data STR for traffic load, high-frequency component data STH derived by extracting the high-frequency component from the statistical data STR, medium-frequency component data STM derived by extracting the medium-frequency component, and low-frequency component data STL derived by extracting the low-frequency component.

Figure 11:
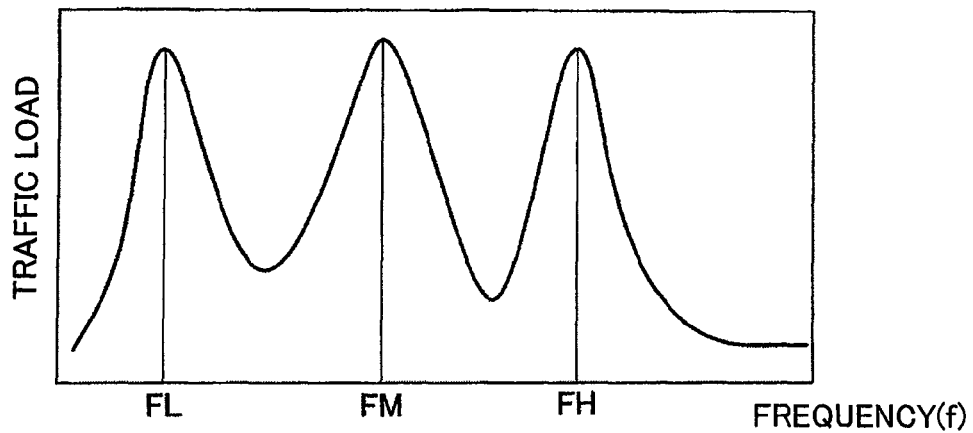
FIG. 11 is a spectrum diagram depicting an example of statistical fluctuation of traffic load in the network transfer system 100, shown by a frequency domain.

FIG. 11 is a spectrum diagram depicting an example of statistical fluctuation of traffic load in the network transfer system 100, shown by a frequency domain. In this example, peaks are observed in a low-frequency band FL, a medium-frequency band FM, and a high-frequency band FH. In this example, such peaks are manifested as fluctuations with a daily cycle (e.g. a high load time slot and a low load time slot), fluctuations with a monthly cycle (e.g. high load at month end or the like, and fluctuations with a yearly cycle (e.g. high load at the turn of the year or at fiscal year end). The inventors created the following control rule based on the discovery that such spectral characteristics are utilizable for more efficient transitioning between the transfer-enabled state Act and multiple standby states STBY1 through STBYn having mutually different transition times to the transfer-enabled state and power consumption levels.

Figure 12:
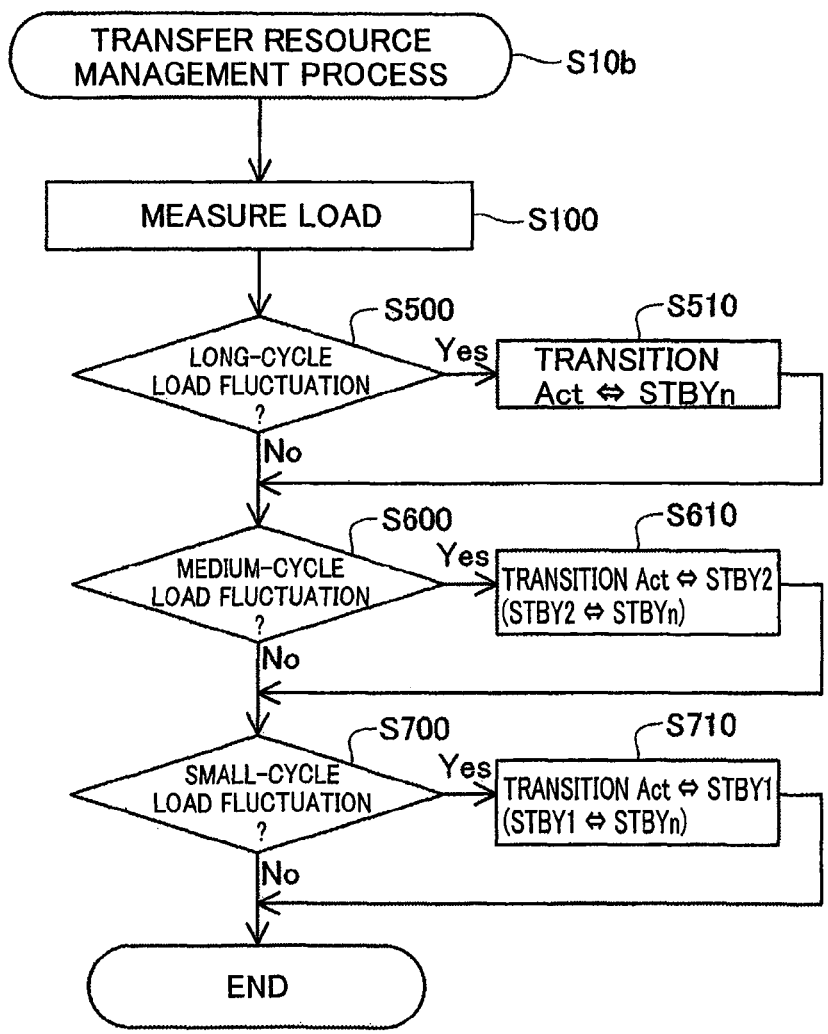
FIG. 12 is a flowchart showing a routine of a transfer resource management process (Step Slob) of Embodiment 2 of the present invention.
Figure 13:
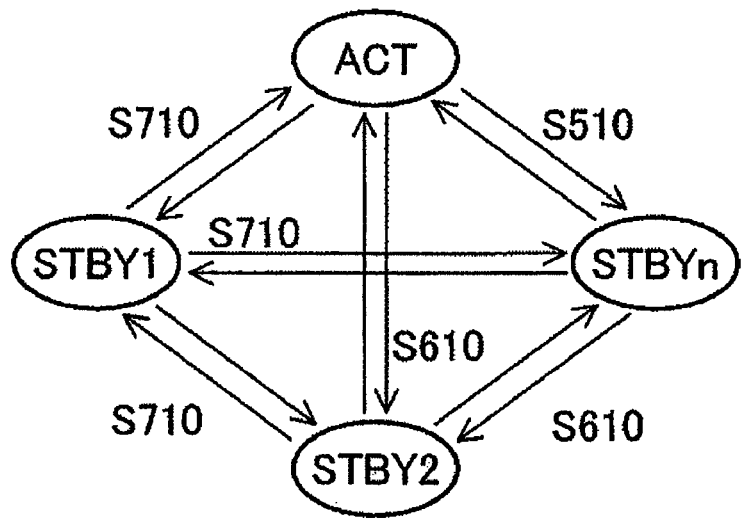
FIG. 13 is an illustration showing relationship of steps to transition targets in the transfer resource management of Embodiment 2.

FIG. 12 is a flowchart showing a routine of a transfer resource management process (Step S10b) of Embodiment 2. FIG. 13 is an illustration showing relationship of steps to transition targets in the transfer resource management of Embodiment 2. In Step S100, traffic load is measured in the same way as in Embodiment 1. In Step S500, the management server 101 decides whether the traffic load exhibits large fluctuations with a long cycle (low frequency).

This decision can be made, for example, by using a filter of a center frequency FL (FIG. 11) prepared in advance to extract the low-frequency component from a time series of data for past traffic load for a prescribed time period; and on the basis of this extracted data determining whether the calculated fluctuation level per unit of time is greater than a prescribed value (or whether it is close to halfway between peaks and valleys of the waveform). If the result of the decision is that large fluctuations appear at a long cycle (sufficiently close to halfway between peaks and valleys of the waveform), after executing transition of the transfer resources between the transfer-enabled state Act and the standby state STBYn having the longest transition time until transfer is enabled (Step S510) in the same way as in Embodiment 1, the process will advance to Step S600. On the other hand, if decision is that large fluctuations do not appear at a long cycle, the process will advance directly to Step S600.

In Step S600, the management server 101 decides whether the traffic load exhibits large fluctuations with a medium cycle (medium frequency). This decision can be made by using a filter of a center frequency FM (FIG. 11) prepared in advance to extract the medium-frequency component from a time series of data for traffic load; and on the basis of this extracted data determining whether the calculated fluctuation level per unit of time is greater than a prescribed value. If the result of the decision is that large fluctuations appear at a medium cycle, after executing transition of the transfer resources between the standby state STBY2 and the transfer-enabled state Act (Step S610) in the same manner as in Embodiment 1, the process will advance to Step S700.

During this transition, it is preferable to carry out transition between the standby state STBY2 and the standby state STBYn in conjunction to suppress fluctuation of the number of transfer resources that have assumed the standby state STBY2. The reason for doing so is to avoid a decline in responsiveness of the network transfer system 100 due to load fluctuations that can be caused by transitions in response to fluctuating load. On the other hand, if decision is that large fluctuations do not appear at a medium cycle, the process will advance directly to Step S700.

In Step S700, the management server 101 decides whether the traffic load exhibits large fluctuations with a short cycle (high frequency). This decision can be made by using a filter of a center frequency FH (FIG. 11) prepared in advance to extract the high-frequency component from a time series of data for traffic load; and on the basis of this extracted data determining whether the calculated fluctuation level per unit of time is greater than a prescribed value. If the result of the decision is that large fluctuations appear at a short cycle, transition of the transfer resources between the standby state STBY1 and the transfer-enabled state Act (Step S710) in the same manner as in Embodiment 1, the process will be executed (Step S710). During this transition, since the number of transfer resources in the standby state STBY1 will increase or decrease, it will be preferable to suppress fluctuation of the number of transfer resources in the standby state STBY1 through transition between the standby state STBY1 and the standby state STBYn.

In this way, in Embodiment 2, the transfer-enabled number Na is adjusted utilizing transition between the transfer-enabled state Act and the standby state STBY1 able to transition in the shortest time and having highest power consumption in the case of short cyclical load fluctuations; utilizing transition between the transfer-enabled state Act and the standby state STBY2 having intermediate transition time and intermediate power consumption in the case of medium cyclical load fluctuations; and utilizing transition between the transfer-enabled state Act and the standby state STBYn of requiring the longest time for transition and having the lowest power consumption in the case of long cyclical load fluctuations, whereby responsiveness to traffic load fluctuations can be improved and more efficient reduction in power consumption can be achieved.

In Embodiment 2 of the present invention, the management server 101 may also calculate the total spectrum of active circuits from the linkup state in all of the circuits of the data transfer control device, and employ the total spectrum of the data transfer control device as the traffic load.

C. Modifications

While the present invention has been shown hereinabove based on certain preferred embodiments, the invention is in no wise limited to the is particular embodiments herein and various modifications can be made without departing from the scope of the invention. Possible modifications include the following, for example.

C-1. In the preceding embodiments, the transfer-enabled number is adjusted through transition between the transfer-enabled state Act and transfer-disabled standby states; however, it would be acceptable to transition among a plurality of transfer-enabled states Act that differ from one another not only in terms of transfer-enabled number but also in terms of capability and power consumption for example; or a combination of transitions between transfer-enabled states Act and standby states, and transitions among the plurality of different transfer-enabled states Act. As a specific example, for transfer resources with a rated processing spectrum of 100 Gbps, it would be possible to establish a low power consumption operating mode in which the process clock frequency is lowered within a range in which transfer functionality may be maintained to drop the processing spectrum to 10 Gbps, and to transition between these states.

Figure 14:
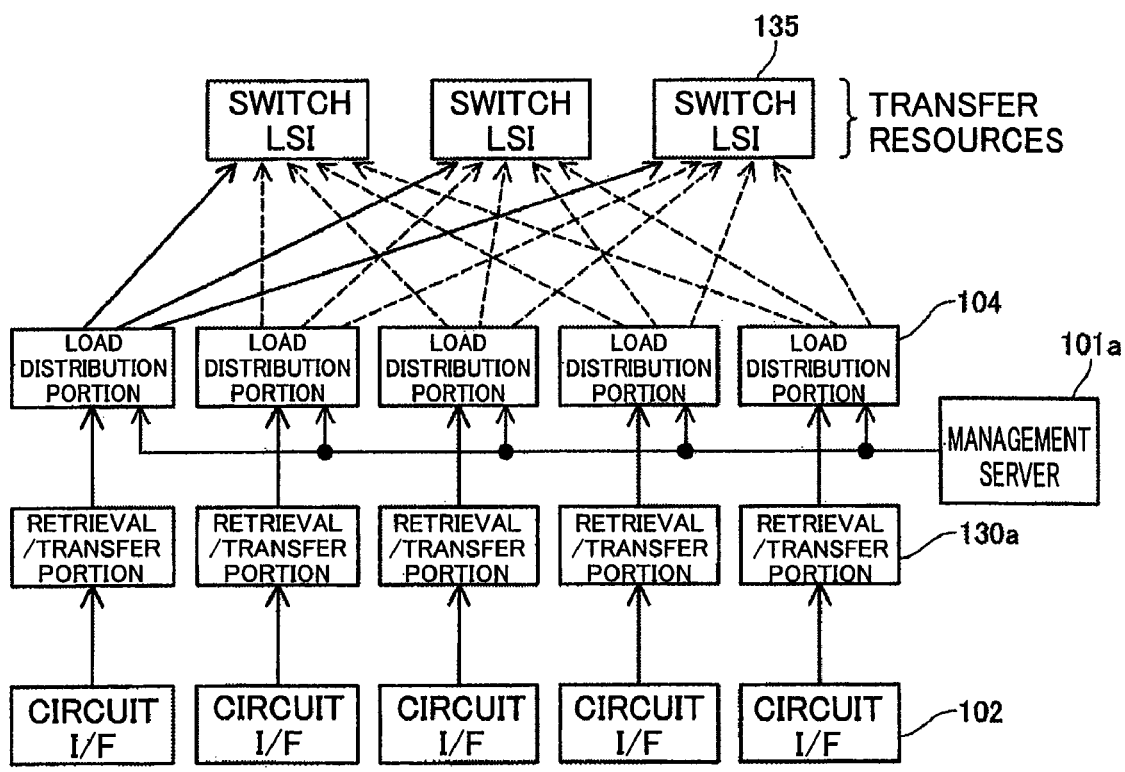
FIG. 14 is a block diagram showing a data transfer control device that uses switch LSI's.

C-2. In the preceding embodiments, the present invention is implemented in a data transfer control device which transfers data using multiple retrieval/transfer resources (retrieval/transfer portions) and which lacks a switch LSI (e.g. a crossbar switch or shared memory switch); however, the present invention could also be implemented in a data transfer device (or communication device) that uses switch LSI's 135 like those shown in FIG. 14. In this embodiment, the plurality of switch LSI's 135 correspond to the "plurality of transfer resources" recited in the claims.

C-3. Furthermore, the present invention may be implemented in a clustering configuration such as that shown in FIG. 15, built from multiple data transfer control devices (or communication devices) which are connected via a network. Clustering refers to a technology whereby, for example, multiple communication devices are interconnected through a network but to a user or other communication device will collectively behave just like a single communication device. Where clustering is implemented, multiple communication devices can be managed just as if a single communication device were being handled; and if one communication device stops, it can be repaired or replaced while processing is ongoing, without having to stop the entire system. By so doing it is possible to reduce management load and achieve robustness to failure through system redundancy, improving overall performance.

Figure 15:
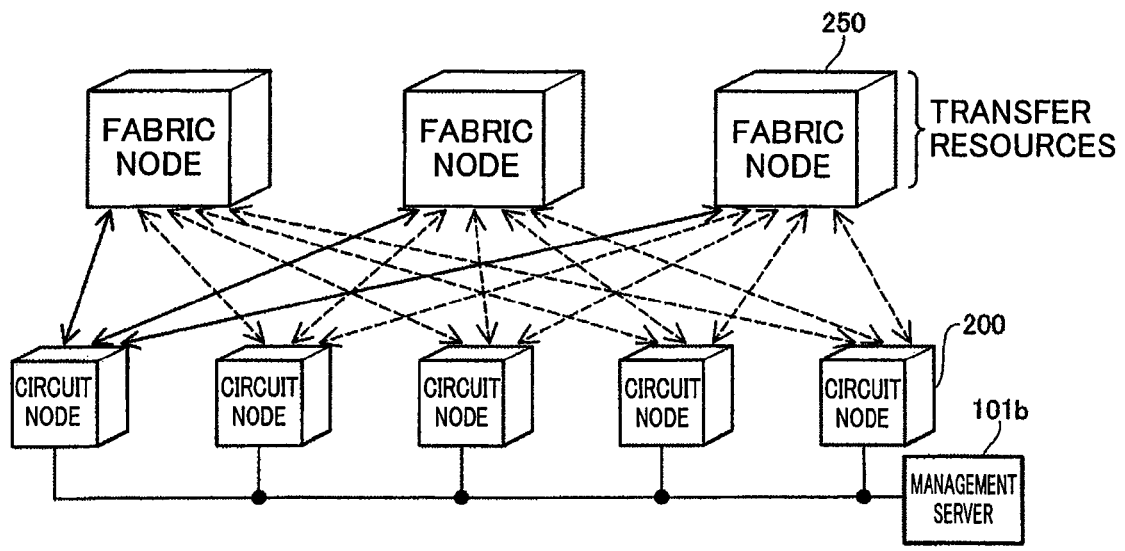
FIG. 15 is a block diagram showing a clustering configuration built from multiple data transfer control devices (or communication devices) connected via a network.

In the modification shown in FIG. 15, the multiple communication devices have on-board circuit nodes 200 for accommodating the circuits; fabric nodes 250 for exchange of frame data among the circuit nodes 200; and a management server 101b. The circuit nodes 200 correspond to circuit cards on-board the communication devices and accommodate the network circuits. The circuit nodes 200 function as the circuit interface portions, retrieval/transfer portions, and load distribution portions discussed earlier. The fabric nodes 250 transfer frame data transferred from the circuit nodes 200, to the circuit nodes 200 having the frame transfer destination ports in devices connected in a clustering configuration. The fabric nodes 250 function as the transfer resources discussed earlier. Depending on device architecture, the fabric nodes 250 may also function as retrieval/transfer portions.

In Modification C-3 of the present invention, the management server 101b may calculate the total spectrum of active external circuits from the linkup state in all of the external circuits in the clustering system of the circuit nodes 200, and control the transfer resources using the total spectrum of the active external circuits as the upper limit. In a transfer process of the total spectrum of active external circuits, in the event it is not necessary to use all of the transfer resources, at least one or more of the transfer resources can be transitioned to the standby state with the lowest power consumption.

Figure 16:
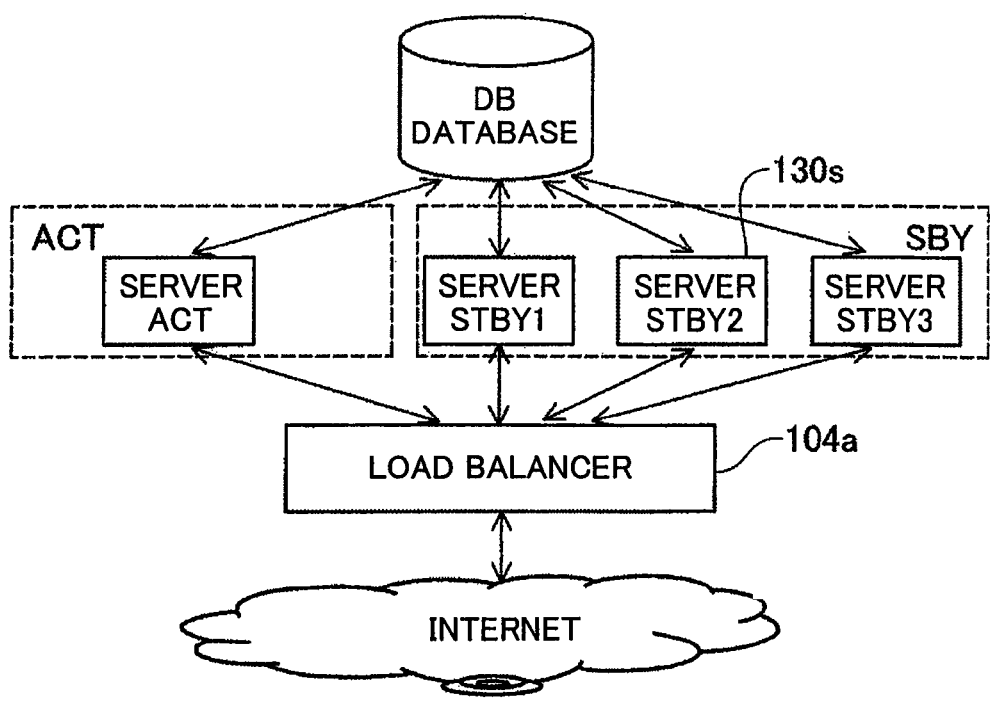
FIG. 16 is a block diagram showing a shared database type clustering system.
Figure 17:
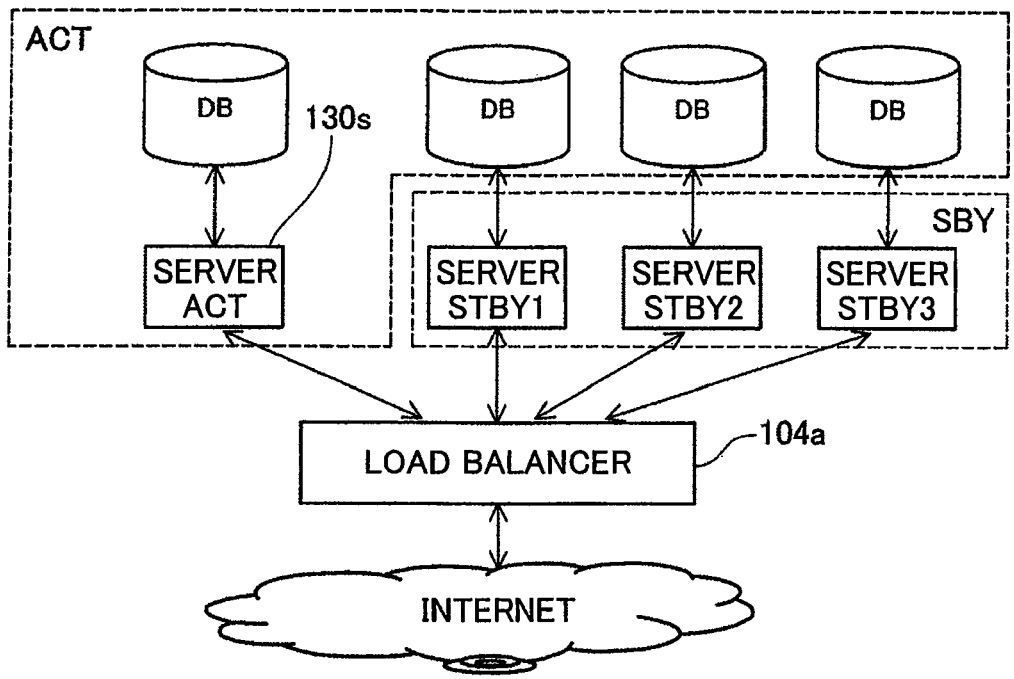
FIG. 17 is a block diagram showing an independent database type clustering system.

Furthermore, clustering systems include both shared database type clustering systems as depicted in FIG. 16, and independent database type clustering systems as depicted in FIG. 17. A shared database type clustering system is a system in which multiple servers 103s are connected to a shared database DB, with distribution of load to the multiple servers 103s being carried out by a load balancer. An independent database type clustering system is a system in which the multiple servers 103s are connected independently to databases DB, with distribution of load to the multiple servers 103s being carried out by a load balancer. In this embodiment, the multiple servers 10 correspond to the "plurality of transfer resources" recited in the claims.

Figure 18:
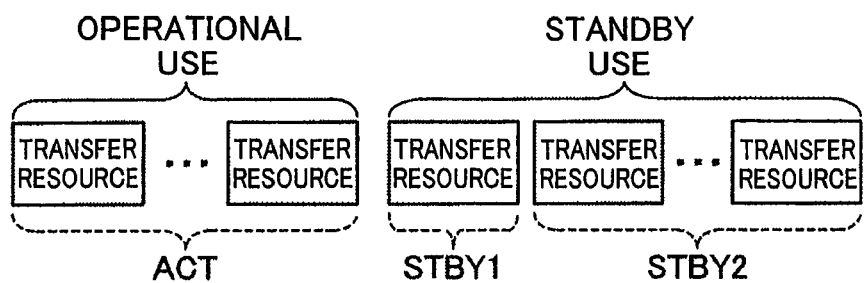
FIG. 18 is a block diagram showing a configuration in which the plurality of standby states do not include a suspended operation state STBYn.
Figure 19:
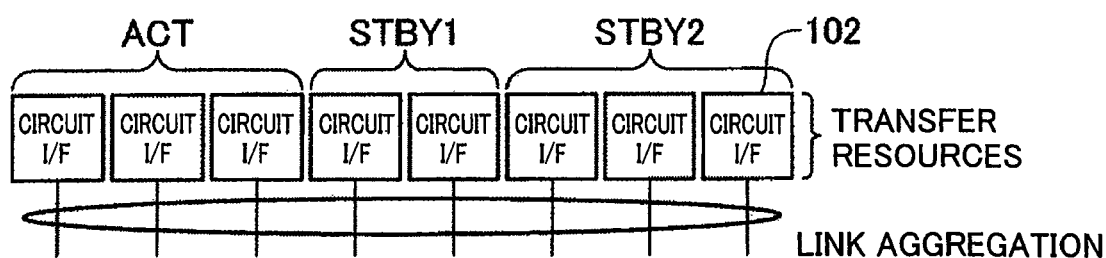
FIG. 19 is a block diagram showing a data transfer control device in which link aggregation is implemented.

C-4. In the preceding embodiments, in an exemplary embodiment of the plurality of standby states they include a suspended operation state STBYn; however, it is not always necessary to include a suspended operation state STBYn among the plurality of standby states, and it would naturally be possible for the invention to be utilized in an embodiment that assures redundancy, such as shown in FIG. 18. The present invention could also be implemented in a data transfer control device (communication device) in which link aggregation has been implemented as shown in FIG. 19.

Link aggregation is a technology for virtual bundling of multiple physical circuits and treating them just like a single circuit. An example is the IEEE P802.3ad standard. Where link aggregation is implemented, it will be possible to use a spectrum equal to the sum total of the specified spectra of the physical circuits. For example, through virtual bundling of five 1 Gbps circuits, it is possible to use a virtual communications spectrum of 5 Gbps. Advantages of link aggregation are that it is possible to expand the communications spectrum without the use of high-speed circuits; and that in the event of a problem on one of the physical circuits, communication can continue uninterrupted using the other circuits.

Figure 20:
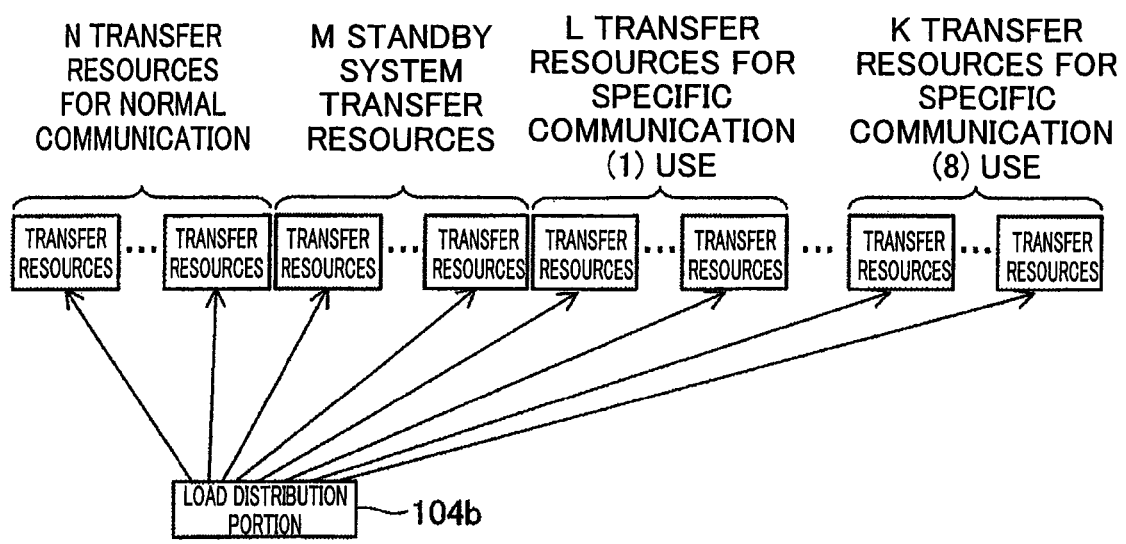
FIG. 20 is a block diagram showing a configuration in which data is distributed according to the individual communication data classes, distributing only the load of a single communication data class to the transfer resources.

C-5. In the preceding embodiments, distribution of load was carried out, for example, according to the communication data classes (communication classified by specific rules) of "multicast communication (specific communication)" and "unicast communication or other non-multicast communication (normal communication)"; however, as shown in FIG. 20 it is possible for the purpose of more efficient and stable communications to implement the present invention in conjunction with an arrangement whereby data is distributed according to the individual communication data classes, distributing only the load of a single communication data class to the transfer resources.

Load distribution involves allocating transfer resources to "multicast communication" and "non-multicast communication" as well as distributing data according to its communication data class; however, other classifications are possible provided they are based on communication data classes, and three or more classifications would be acceptable as well. Specifically, it is sufficient for the plurality of transfer resources to be assigned individually to a plurality of preclassified communication data classes in an arrangement whereby the load distribution portions analyze which of the multiple communication data classes was used for communicating the input data and distribute the analyzed data to the transfer resource to which the communication data class of the analyzed data was assigned.

By so doing it is possible to increase process efficiency and stability by narrowing down the communication data classes targeted for processing by the transfer resources. Furthermore, where combined with Embodiment 2, the cycles of each of the individual classified communication data classes can be utilized to enhance the control rules, and achieve both reduced power consumption and a stabilized data transfer process.

Furthermore, with an arrangement focused on communication data classes, it is not always necessary to assign multiple transfer resources on the basis of communication data class; control rules can be enhanced by focusing on both communication data class and load cycle. For example, since the cyclical nature of communication and the importance of communication differ between data communication by telephone and other kinds of communication, where control is possible through focus on communication data class and cycle in this way, it will be possible to provide a control device that more closely meets user needs.

C-6. In the preceding embodiments, load prediction was carried out on the basis of the cyclical nature of the load; however, it would be possible to make a prediction on the basis of an increase in load due to a non-regular event such as the World Cup or the opening of the high school baseball season (opening day is different each year), for which it is difficult to predict increased load based on periodic nature (season) alone, but which is nevertheless a scheduled event that is known in advance. In this way, fluctuations in load may be predicted on the basis of information representing predicted load fluctuations that have been predicted in advance outside the network transfer system 100.

Specifically, the management server 101 may be provided with a memory area, not shown, having an event calendar (load prediction information) stored therein; and load may be predicted on the basis of this event calendar. The present invention is applicable to instances in which load is predicted by any of various methods: for example it would be acceptable to predict load fluctuations on the basis of the rate of change of load; or to compile a database of load fluctuation patterns and to activate extra transfer resources in response to detection of an unknown fluctuation pattern.

What is claimed is:

1. A data transfer control device connected to a plurality of circuits, comprising:
    a plurality of transfer resources, each identifying a transfer destination of frame data received from the circuits and transferring the frame data;
    a transfer resource management portion that sets an operating status of each of the plurality of transfer resources to either one of a transfer-enabled state whereby data transfer is enabled and a plurality of standby states based on a load on the data transfer control device and that manages each of the plurality of transfer resources so as to assume the set operating status; and
    a load distribution portion that distributes the frame data received from the circuits to transfer resources that have been set to the transfer-enabled state,
    wherein the plurality of standby states are states which data transfer is disabled and which mutually differ in terms of at least one of power consumption level and transition time to the transfer-enabled state, and
    wherein the plurality of transfer resources, in response to an instruction from the transfer resource management portion, include:
    a first transfer resource set in the transfer-enabled state;
    a second transfer resource set in one of the plurality of standby states; and
    a third transfer resource set in another of the plurality of standby states that differs from the standby state of the second transfer resource in terms of at least one of power consumption level and transition time to the transfer-enabled state.

2. The data transfer control device according to claim 1, wherein the plurality of standby states includes at least two standby states in which the transition time is longer the lower the power consumption level.

3. The data transfer control device according to claim 1, wherein management of the transfer resources additionally involves measuring a load on each individual circuit of the data transfer control device, and managing the plurality of transfer resources based on the total load measured on all circuits.

4. The data transfer control device according to claim 1, wherein the transfer resource management portion additionally predicts fluctuation of a load and carries out management of the plurality of transfer resources based on the predicted fluctuation.

5. The data transfer control device according to claim 4, wherein management of the transfer resources additionally involves calculating a sum of the linkup speeds of all circuits of the data transfer control device; and
predicting fluctuation of load using the calculated sum of the linkup speeds of all circuits as an upper limit; and carrying out management of the plurality of transfer resources based on the predicted fluctuation.

6. The data transfer control device according to claim 1, wherein management of the transfer resources additionally involves predicting fluctuation of the load on each individual circuit of the data transfer control device, and managing the plurality of transfer resources based on the predicted total load on all circuits.

7. The data transfer control device according to claim 4, wherein the transfer resource management portion additionally stores load prediction information predicted in advance and relating to future load fluctuation, and carries out the prediction based on the load prediction information.

8. The data transfer control device according to claim 4, wherein the transfer resource management portion additionally carries out prediction on the basis of cyclical nature of the load.

9. The data transfer control device according to claim 8, wherein management of the plurality of transfer resources based on the predicted fluctuation additionally involves prediction of fluctuation of the load in relation to at least one specific period, and management of at least one specific standby state among the plurality of standby states based on the predicted fluctuation of load in the specific period.

10. The data transfer control device according to claim 8, wherein management of the plurality of transfer resources based on the predicted fluctuation additionally involves predicting fluctuation of the load in relation to a plurality of specific periods; and
associating individual fluctuations of the load with individual transitions of a plurality of specific standby states among the plurality of standby states based on load fluctuation predicted for each of the plurality of specific periods,
wherein the associations are made such that specific periods of longer period correspond to standby states for which the power consumption is lower.

11. The data transfer control device according to claim 10, wherein data transfer control device carries out data transfer through a plurality of communication data classes having been pre-classified into a plurality of types,
and management of the plurality of transfer resources based on the predicted fluctuation additionally involves predicting fluctuation of the load in at least one type of specific communication data class among the plurality of types of communication data class in relation to a plurality of specific periods; and
associating individual fluctuations of the load with individual transitions of a plurality of specific standby states among the plurality of standby states based on load fluctuation predicted for each of the plurality of specific periods in the specific communication data class.

12. The data transfer control device according to claim 1, wherein the data transfer control device carries out data transfer through a plurality of communication data classes having been pre-classified into a plurality of types, each of the plurality transfer resources in the transfer-enabled state is assigned any of the plurality of types of communication data class, the transfer resource management portion additionally manages the transfer resources for each of the plurality of types of communication data class based on load fluctuation for each of the plurality of types of communication data class, and the load distribution portion additionally analyzes which of the plurality of types of communication data class is being used to communicate the data, and distributes the data by distributing the analyzed data to transfer resources assigned to the same communication data class as the analyzed data.

13. The data transfer control device according to claim 12, wherein management of the transfer resources additionally involves measuring load fluctuation in at least one specific communication data class among a plurality of communication data classes, in each circuit of the data transfer control device; and managing the plurality of transfer resources based on the total load of all of the measured circuits.

14. The data transfer control device according to claim 12, wherein management of the transfer resources additionally involves predicting load fluctuation in at least one type of specific communication data class among the plurality of types of communication data class, and managing the plurality of transfer resources based on the predicted fluctuation.

15. The data transfer control device according to claim 12, wherein management of the transfer resources additionally involves predicting load fluctuation in at least one specific communication data class among a plurality of communication data classes, in each circuit of the data transfer control device, and managing the plurality of transfer resources based on the predicted fluctuation.

16. The data transfer control device according to claim 14, wherein the transfer resource management portion additionally stores load prediction information predicted in advance and relating to future load fluctuation, and carries out the prediction based on the load prediction information.

17. The data transfer control device according to claim 14, wherein the transfer resource management portion additionally carries out the prediction based on cyclical nature of the load.

18. The data transfer control device according to claim 17, wherein management of the plurality of transfer resources additionally involves predicting load fluctuation in the specific communication data class in relation to at least one specific period, and based on the predicted load fluctuation in the specific communication data class in the specific period, managing transition among at least one specific standby state among the plurality of standby states and transfer resources in the transfer-enabled state which have been assigned to the specific communication data class.

19. The data transfer control device according to claim 1, wherein the plurality of standby states includes a suspended operation state in which the supply of power is suspended, and during transition to the transfer-enabled state of a transfer resource in an operating state which is one of the plurality of standby states except for the suspended operation state, the transfer resource management portion additionally carries out transition of a transfer resource in the suspended operation state to the state of the transitioned transfer resource prior to the transition.

20. A network transfer system for transferring data in a network, comprising:
- a circuit interface portion connected to a network circuit, for transmitting and receiving the data;
- a plurality of transfer resources for carrying out transfer processing of the data, and each of the plurality of transfer resources identifying a transfer destination of frame data received from the circuits and transferring the frame data;
- a data transfer control device connected to a plurality of circuits, the data transfer control device comprising:
- a plurality of transfer resources;
- a transfer resource management portion that sets an operating status of each of the plurality of transfer resources to either one of a transfer-enabled state whereby data transfer is enabled and a plurality of standby states based on a load on the data transfer control device and that manages each of the plurality of transfer resources so as to assume the set operating status; and
- a load distribution portion that distributes the frame data received from the circuits to transfer resources that have been set to the transfer-enabled state,
- wherein the plurality of standby states are states which data transfer is disabled and which mutually differ in terms of at least one of power consumption level and transition time to the transfer-enabled state, and
- wherein the plurality of transfer resources, in response to an instruction from the transfer resource management portion, include:
- a first transfer resource set in the transfer-enabled state;
- a second transfer resource set in one of the plurality of standby states; and
- a third transfer resource set in another of the plurality of standby states that differs from the standby state of the second transfer resource in terms of at least one of power consumption level and transition time to the transfer-enabled state.

21. A data transfer control method for transferring the frame data, in a data transfer control device comprising a plurality of transfer resources, each identifying a transfer destination of received frame data and transferring the frame data, the method comprising the steps of:
- setting an operating status of each of the plurality of transfer resources to either one of a transfer-enabled state whereby data transfer is enabled and a plurality of standby states based on a load on the data transfer control device,
- wherein the plurality of standby states are states which data transfer is disabled and which mutually differ in terms of at least one of power consumption level and transition time to the transfer-enabled state;
- managing each of plurality of transfer resources so as to assume the set operating status;
- distributing the frame data to transfer resources that have been set to the transfer-enabled state; and when a transfer resource set in one of the plurality of standby states makes transition to the transfer-enabled state in response to a fluctuation of the load on the data transfer control device, causing another transfer resource set in another of the plurality of standby states to make transition to a different standby state that differs in terms of at least one of power consumption level and transition time to the transfer-enabled state.

22. The data transfer control device according to claim 1, wherein when the second transfer resource set in the one of the standby states makes transition to the transfer-enabled state in response to a fluctuation of the load on the data transfer control device, the transfer resource management portion causes the third transfer resource set in the another of the plurality of standby states to make transition to a different standby state that differs in terms of at least one of power consumption level and transition time to the transfer-enabled state.

23. A data transfer control device connected to a plurality of circuits, comprising:
- a plurality of transfer resources, each transferring data received from the circuits; and
- a transfer resource management portion that sets operating status of each of the plurality of transfer resources to either one of a plurality of transfer-enabled states based on a load on the data transfer control device and that manage each of the plurality of transfer resources so as to assume the set operating status,
- wherein the plurality of transfer-enabled states are states which data transfer is enabled and which mutually differ in terms of at least one of performance and power consumption level; and
- a load distribution portion that distributes the data to transfer resources that have been set to the transfer-enabled states,
- wherein in response to an instruction from the transfer resource management portion, the plurality of transfer resources include:
- a first transfer resource set in one of the plurality of transfer-enabled states; and
- a second transfer resource set in another of the plurality of transfer-enabled states that differs from the transfer-enabled state of the first transfer resource in terms of at least one of performance and power consumption level.

24. The data transfer control device according to claim 23, wherein the transfer resource management portion further sets the operating status of each of the plurality of transfer resources to either one of a plurality of standby states whereby data transfer is disabled, in addition to the plurality of transfer-enabled states, based on the load on the data transfer control device and manages each of the plurality of transfer resources so as to assume the set operating status.

* * * * *